US010385957B2

(12) United States Patent
Abrahamson

(10) Patent No.: US 10,385,957 B2
(45) Date of Patent: Aug. 20, 2019

(54) FOLLOWER MECHANISM

(71) Applicant: Koyo Bearings North America LLC, Westlake, OH (US)

(72) Inventor: Scott Abrahamson, Piedmont, SC (US)

(73) Assignee: Koyo Bearings North America LLC, Westlake, OH (US)

(*) Notice: Subject to any disclaimer, the term of this patent is extended or adjusted under 35 U.S.C. 154(b) by 0 days.

(21) Appl. No.: 16/172,467

(22) Filed: Oct. 26, 2018

(65) Prior Publication Data

US 2019/0063580 A1  Feb. 28, 2019

Related U.S. Application Data

(63) Continuation of application No. 15/486,955, filed on Apr. 13, 2017, now Pat. No. 10,119,607.
(Continued)

(51) Int. Cl.
*F16H 53/06* (2006.01)
*F02M 59/10* (2006.01)
(Continued)

(52) U.S. Cl.
CPC ........... *F16H 53/06* (2013.01); *F02M 59/102* (2013.01); *F16C 13/006* (2013.01); *F16C 13/022* (2013.01); *F16C 19/26* (2013.01); *F16C 19/466* (2013.01); *F16C 2360/18* (2013.01); *F16C 2360/22* (2013.01)

(58) Field of Classification Search
CPC ....... F16H 53/06; F02M 59/102; F16C 19/26; F16C 2360/18
See application file for complete search history.

(56) References Cited

U.S. PATENT DOCUMENTS 1,613,117 A    1/1927  Miller
1,848,083 A    3/1932  Wetherald
(Continued)

FOREIGN PATENT DOCUMENTS

DE    3149356 A1    6/1983
DE    3820645 A1    12/1989
(Continued)

OTHER PUBLICATIONS

Office Action dated Feb. 14, 2018, for corresponding German application No. 102017206523.0.
(Continued)

*Primary Examiner* — Vicky A Johnson
(74) *Attorney, Agent, or Firm* — Nelson Mullins Riley & Scarborough LLP

(57) ABSTRACT

A follower mechanism including an outer cup having a substantially cylindrical side wall, an annular lip portion disposed at a first end of the side wall, and an annular ledge disposed on the side wall, the annular ledge being disposed in a plane that is transverse to a longitudinal center axis of the follower mechanism. An inner cup includes an annular lip extending outwardly therefrom and a pair of shaft apertures, and is disposed in the outer cup so that the lip abuts the annular ledge of the outer cup and is non-rotatably fixed thereto by the annular lip of the outer cup which abuts the lip of the inner cup. A shaft is received in the shaft apertures, and a roller follower is rotatably received on the shaft such that a portion of the roller follower extends axially outwardly beyond the annular lip portion of the outer cup.

10 Claims, 17 Drawing Sheets

Related U.S. Application Data

(60) Provisional application No. 62/379,505, filed on Aug. 25, 2016, provisional application No. 62/323,110, filed on Apr. 15, 2016.

(51) Int. Cl.
*F16C 19/26* (2006.01)
*F16C 13/00* (2006.01)
*F16C 13/02* (2006.01)
*F16C 19/46* (2006.01)

(56) References Cited

U.S. PATENT DOCUMENTS

| | | |
|---|---|---|
| 2,891,525 A | 6/1959 | Moore |
| 4,317,433 A | 3/1982 | Fuhrmann |
| 4,335,685 A | 6/1982 | Clouse |
| 4,829,950 A | 5/1989 | Kanamaru et al. |
| 5,239,953 A | 8/1993 | Shida |
| 5,280,771 A | 1/1994 | Groh et al. |
| 5,553,512 A | 9/1996 | Harimoto |
| 5,664,530 A | 9/1997 | Ammon et al. |
| 5,904,123 A | 5/1999 | Ammon et al. |
| 5,954,020 A | 9/1999 | Schmidt et al. |
| 5,975,038 A | 11/1999 | Fischer et al. |
| 5,979,385 A | 11/1999 | Speil et al. |
| 6,192,846 B1 | 2/2001 | Speil |
| 6,619,251 B2 | 9/2003 | Kobayashi et al. |
| 6,684,838 B2 | 2/2004 | Pluta et al. |
| 7,143,731 B2 | 12/2006 | Kirbach et al. |
| 7,159,552 B2 | 1/2007 | Backert et al. |
| 7,793,583 B2 | 9/2010 | Radinger et al. |
| 8,201,532 B2 | 6/2012 | Prokop |
| 8,235,018 B2 | 8/2012 | Dorn et al. |
| 8,474,427 B2 | 7/2013 | Dorn et al. |
| 8,863,716 B2 | 10/2014 | Dorn |
| 9,032,863 B2 | 5/2015 | Chambonneau et al. |
| 9,243,521 B2 | 1/2016 | Cornett et al. |
| 10,119,607 B2 | 11/2018 | Abrahamson |
| 2008/0190237 A1 | 8/2008 | Radinger |
| 2012/0125277 A1 | 5/2012 | Chambonneau et al. |
| 2013/0340695 A1 | 12/2013 | Fujii et al. |
| 2015/0090211 A1 | 4/2015 | Champalou |
| 2015/0192098 A1 | 7/2015 | Dorn et al. |
| 2015/0337941 A1 | 11/2015 | Champalou et al. |

FOREIGN PATENT DOCUMENTS

| | | |
|---|---|---|
| DE | 10360467 A1 | 7/2005 |
| DE | 102013216562 A1 | 2/2015 |
| EP | 2853699 A1 | 4/2015 |
| GB | 1349040 A | 3/1974 |
| GB | 1354338 A | 6/1974 |
| JP | S5540269 A | 3/1980 |
| JP | 2004257286 A | 9/2004 |
| JP | 2010511834 A | 4/2010 |
| JP | 2011094596 A | 5/2011 |
| JP | 2013217304 A | 10/2013 |
| JP | 2015068503 A | 4/2015 |
| KR | 10-2012-0067313 A | 6/2012 |
| WO | 2006018069 A1 | 2/2006 |
| WO | 2012013376 A1 | 2/2012 |
| WO | 2015106051 A1 | 7/2015 |

OTHER PUBLICATIONS

Office Action dated Mar. 20, 2018, for corresponding Japanese Application No. 20171080817.

FOLLOWER MECHANISM

CLAIM OF PRIORITY

This application is a continuation of U.S. patent application Ser. No. 15/486,955, filed Apr. 13, 2017, now U.S. Pat. No. 10,119,607, which claims the benefit of U.S. Provisional Patent Application No. 62/323,110, filed Apr. 15, 2016, and U.S. Provisional Patent Application No. 62/379,505, filed Aug. 25, 2016, the entire disclosures of which are incorporated herein.

FIELD OF THE INVENTION

The present invention relates generally to follower mechanisms. More particularly, the present invention relates to designs and assembly methods of follower mechanisms and their associated alignment devices.

BACKGROUND OF THE INVENTION

Follower mechanisms are often used in a valve train of an internal combustion engine to transmit motion from a camshaft of the engine to one or more intake or exhaust valves. As the camshaft rotates, the follower mechanisms receive both a sideways force and a downward force from corresponding lobes on the camshaft, but only transmit the downward force to the valves to open and/or close the valves. Follower mechanisms thereby reduce the possibility of bending or otherwise damaging the valve stems of the valves. As well, follower mechanisms are often used in camshaft driven, high-pressure fuel pumps which are used in gasoline direct injection systems.

Existing bucket-type follower mechanisms typically include either a stamped or cold formed bucket. A roller follower is typically supported on a shaft that is directly fixed to the bucket such as by staking, swaging, etc. As such, the bucket is a load bearing member and, therefore, requires heat treatment and operations such as grinding. As well, follower mechanisms often have some form of alignment device carried in an aperture defined by the bucket such that rotation of the follower mechanism within its corresponding bore is prevented. One example of known alignment devices includes a mushroom-shaped pin that is fixed in an aperture of the follower mechanism's bucket. Such pins can be difficult to manufacture because of their complicated shapes. As well, required heat treatments of the bucket can cause distortion of the aperture which receives the alignment device, thereby complicating assembly. Such alignment devices are often fixed in their corresponding apertures by an interference fit.

The present invention recognizes and addresses considerations of prior art constructions and methods.

SUMMARY OF THE INVENTION

One embodiment of the present disclosure provides a follower mechanism movable within a bore along a longitudinal center axis of the bore, the mechanism including an outer cup having an inner surface and an outer surface defining a substantially cylindrical side wall, an annular lip portion disposed at a first end of the side wall, and an annular ledge disposed on the inner surface of the side wall, the annular ledge being disposed in a plane that is transverse to a longitudinal center axis of the follower mechanism, an inner cup including an annular lip extending outwardly therefrom and a pair of shaft apertures, the inner cup being disposed in the outer cup so that the lip of the inner cup abuts the annular ledge of the outer cup and is non-rotatably fixed thereto by the annular lip of the outer cup which abuts the lip of the inner cup, a shaft having a first end and a second end, each of the first end and the second end being disposed in a corresponding one of the shaft apertures, and a roller follower rotatably received on the shaft such that a portion of the roller follower extends axially outwardly beyond the annular lip portion of the outer cup Another embodiment of the present disclosure provides a follower mechanism movable within a bore along a longitudinal center axis of the bore, the mechanism including an outer cup having an inner surface and an outer surface defining a substantially cylindrical side wall, an annular lip portion disposed at a first end of the side wall, and an annular ledge disposed on the inner surface of the side wall, the annular ledge being disposed in a plane that is transverse to a longitudinal center axis of the follower mechanism, an inner cup including an annular lip extending outwardly therefrom, the inner cup being disposed in the outer cup so that the lip of the inner cup abuts the annular ledge of the outer cup and is non-rotatably fixed thereto by the annular lip of the outer cup which abuts the lip of the inner cup, and a roller follower rotatably supported by the inner cup.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1A:
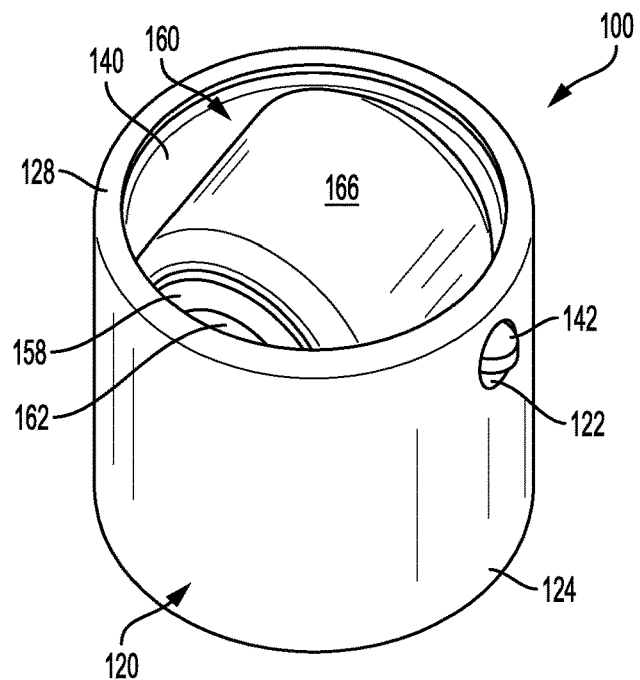
FIGS. 1A and 1B are perspective views of an embodiment of a follower mechanism in accordance with the present disclosure.
Figure 1B:
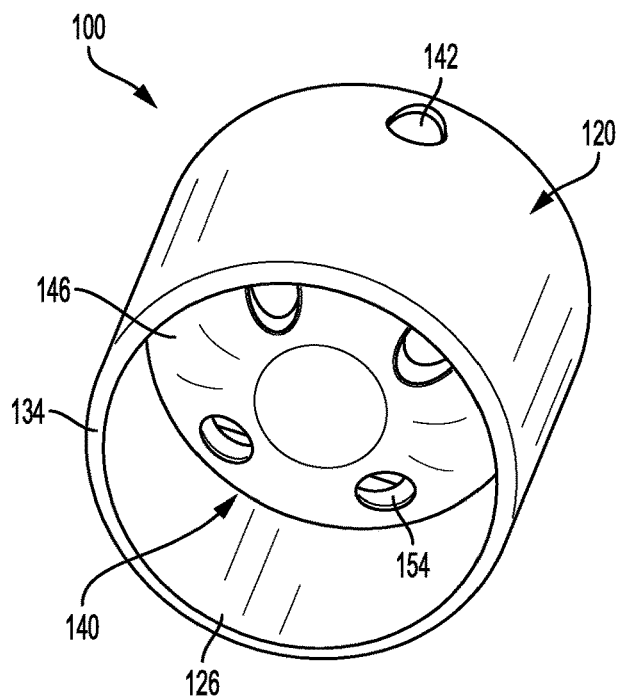

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 6:
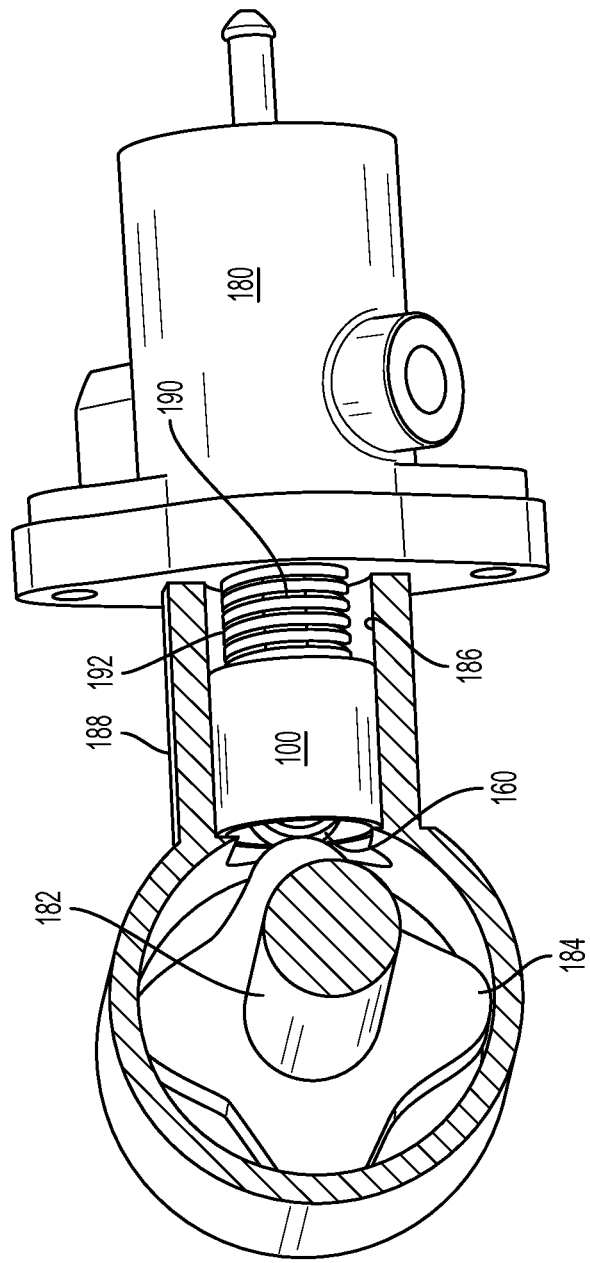
FIG. 6 is a partial cross-sectional view of a high pressure fuel pump including the follower mechanism shown in FIGS. 1A and 1B.

Referring now to the figures, as shown in FIGS. 1A through 3C, an embodiment of a follower mechanism 100 in accordance with the present disclosure includes a substantially cylindrical outer cup 120, an inner cup 140 received therein, a roller follower 160 supported by inner cup 140, and an alignment device 142 extending through an aperture 122 formed in outer cup 120. As shown in FIG. 6, follower mechanism 100 is used in a high-pressure fuel pump 180 of an internal combustion engine, although other uses for follower mechanism 100 are possible. As a camshaft 182 of the engine rotates, a lobe 184 of camshaft 182, or a rocker arm (not shown) connected to camshaft 186, engages roller follower 160 of follower mechanism 100 to convert the rotational motion of camshaft 182 into linear motion of follower mechanism 100 within a bore 186 of a corresponding cylinder head 188. A pump stem 190 of pump 180 is positioned within and connected to follower mechanism 100 such that, as follower mechanism 100 moves in a linear direction within bore 186, pump stem 190 is alternatingly moved left (as shown) by spring 192 and right by follower mechanism 100. Forces from camshaft 182 are thereby transmitted through follower mechanism 100 to pump 180 such that only forces in substantially the same direction as the motion of pump stem 190 act on pump 180. In addition, follower mechanism 100 serves as a torsional vibration isolation device between camshaft 182 and pump 180 to inhibit rotational forces from being transmitted. As shown, alignment device 142 (FIG. 1A) is an outwardly extending tab, a portion of which is slidably received in a correspondingly shaped alignment groove (not shown) defined by the inner wall of bore 186.

Figure 5:
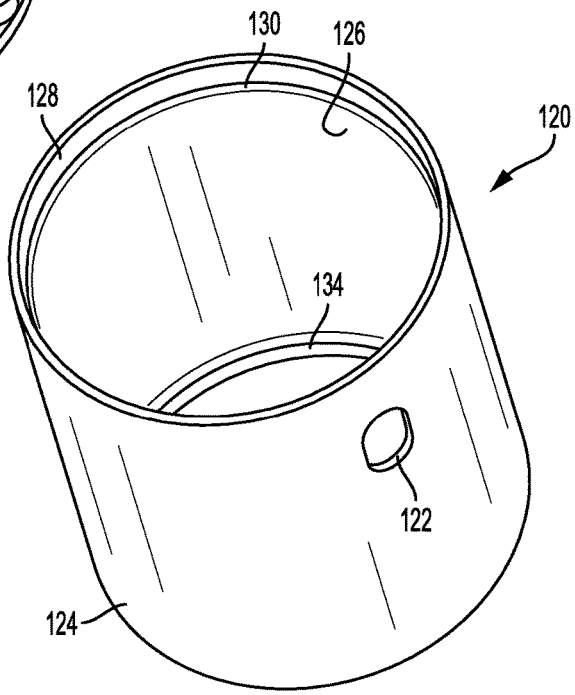
FIG. 5 is a perspective view of an outer cup of the follower mechanism shown in FIGS. 1A and 1B.

Referring additionally to FIG. 5, outer cup 120 of the present embodiment includes a cylindrical outer surface 124, a cylindrical inner surface 126 substantially concentric therewith, and aperture 122 defined therein for receiving alignment device 142. As shown, aperture 122 is generally circular, but could be oval, square, etc., as well. Outer cup 120 is preferably formed from a sheet metal blank of low, medium or high carbon plain or alloy steel by a stamping process, or deep drawing process using a multi-station transfer or progressive press, in which case aperture 122 is formed by, for example, piercing, machining, or otherwise cutting into outer cup 120. Additionally, outer cup 120 includes an annular lip 128 and 134 formed at each of its opposing ends. Annular lip 128 is thinner in the radial direction than the remaining side wall of outer cup 120, forming an annular ledge 130 therewith. In its initial state, prior to fully assembling follower mechanism 100, annular lip 128 extends axially outwardly parallel to a longitudinal center axis 132 of outer cup 120, whereas annular ledge 130 lies in a plane that is transverse to longitudinal center axis 132. When forming outer cup 120, annular lip 134 may be initially formed depending radially inwardly as the other components of the roller follower are preferably placed into outer cup 120 from the end at which annular lip 128 is disposed.

Figure 3A:
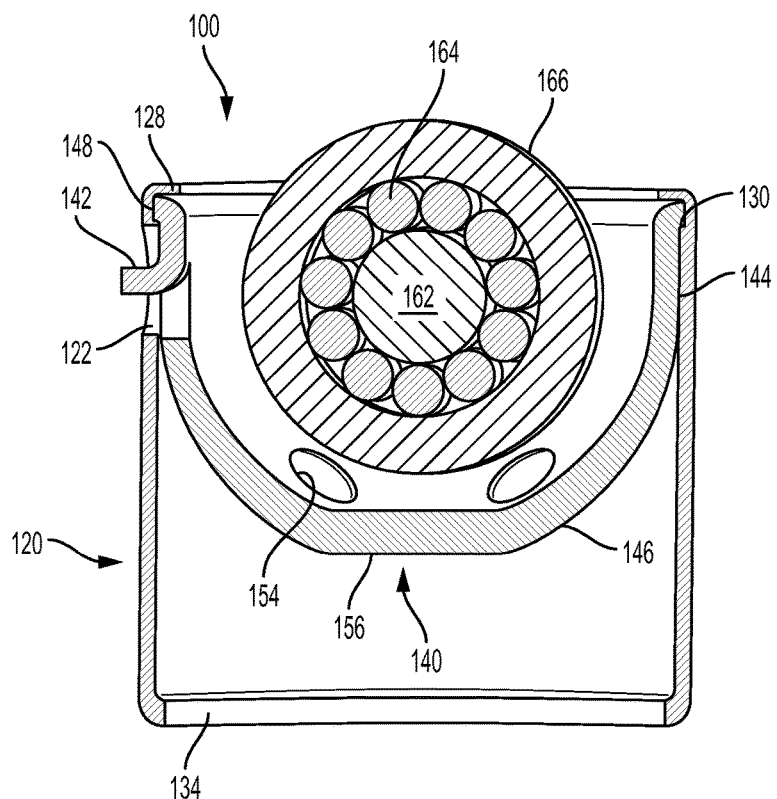
FIGS. 3A, 3B and 3C are cross-sectional views of the follower mechanism shown in FIGS. 1A and 1B.
Figures 3B, 3C:
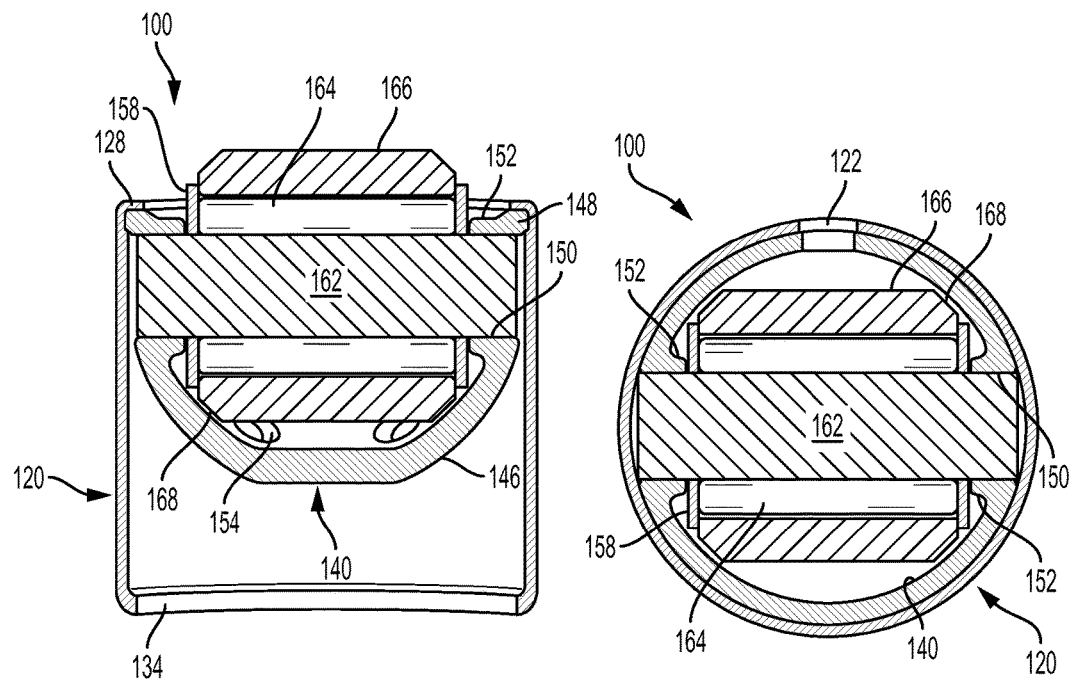
Figure 4A:
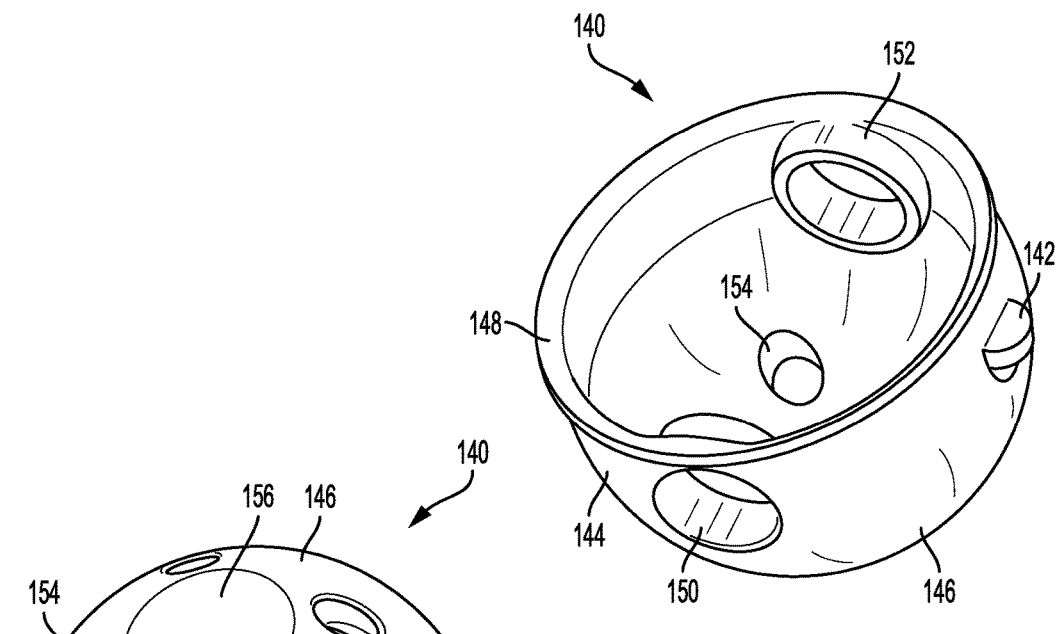
FIGS. 4A and 4B are perspective views of an inner cup of the follower mechanism shown in FIGS. 1A and 1B.
Figure 4B:
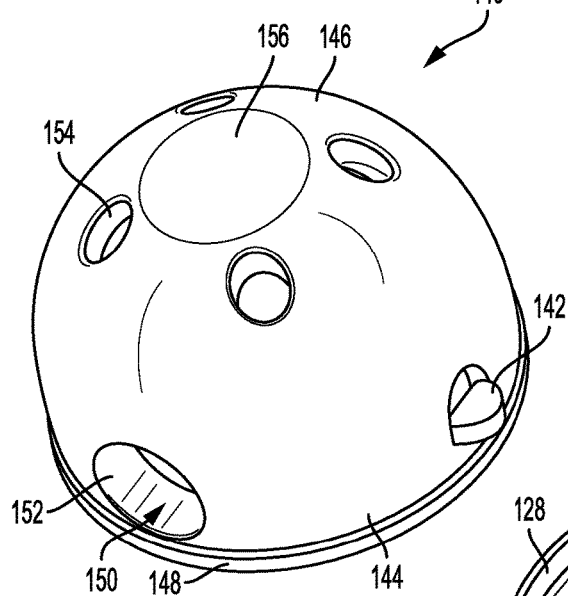

Referring additionally to FIGS. 4A and 4B, inner cup 140 preferably includes a cylindrical side wall 144, a semi-spherical bottom portion 146, an upper lip 148 extending radially outwardly from an upper perimeter of the side wall, a pair of shaft apertures 150 defined by side walls 144, and alignment tab 142 extending outwardly from the side wall. As best seen in FIGS. 1A, 3A and 3B, when fully inserted in outer cup 120, upper lip 148 of inner cup 140 rests on annular ledge 130 of outer cup 120 and alignment tab 142 extends outwardly from alignment aperture 122. Once fully inserted in outer cup 120 and rotationally positioned by way of alignment tab 142, inner cup 140 is retained therein by folding annular lip 128 over inwardly, such as by crimping, spin curling, punch forming, etc., so that upper lip 148 is non-rotatably squeezed between annular lip 128 and annular ledge 130. Note, since outer cup 120 does not directly support shaft 162 of roller follower 160, it does not require the heat treatment processes that are typically performed on the outer cups of known follower mechanisms. As such, the folding/crimping operation performed on annular lip 128 is facilitated. However, in those applications where heat treatment of outer cup 120 is desired for wear purposes, the heat treatment process occurs after aperture 122 is formed for receiving alignment feature 142. Next, prior to folding, crimping, etc., annular lip 128 over inwardly, annular lip 128 is tempered to facilitate the operation and help prevent cracking.

Preferably, inner cup 140 is formed from a sheet metal blank by a stamping process, or drawing process, and is subjected to heat treatment processes as it directly supports shaft 162 of follower mechanism 100 and supports the cyclical force exerted by pump stem 190 (FIG. 6) on the bottom of inner cup 140. Prior to the heat treatment processes, shaft apertures 150 are pierced in side wall 144 of inner cup 140 and extruded so that a boss 152 is formed about each shaft aperture 150. Similarly, lubrication apertures 154 are also pierced in semi-spherical bottom portion 146 of inner cup 140 prior to any heat treatment processes. As shown, alignment tab 142 includes a rounded distal end that is correspondingly shaped to the alignment groove (not shown) that is formed in the corresponding cylinder head 188 (FIG. 6). As shown, preferably, a portion of semi-spherical bottom portion 146 may be flattened, thereby forming a bottom wall 156 that is perpendicular to longitudinal center axis 132 of follower mechanism 100. Bottom wall 156 facilitates the transfer of forces from follower mechanism 100 to the corresponding pump stem 190, or in the alternative, valve stem. Note, however, in alternate embodiments, the cross-sectional shape of bottom portion 146 may have a constant radius of curvature. Alternatively, bottom portion 146 may be simply dome-shaped.

Figure 2:
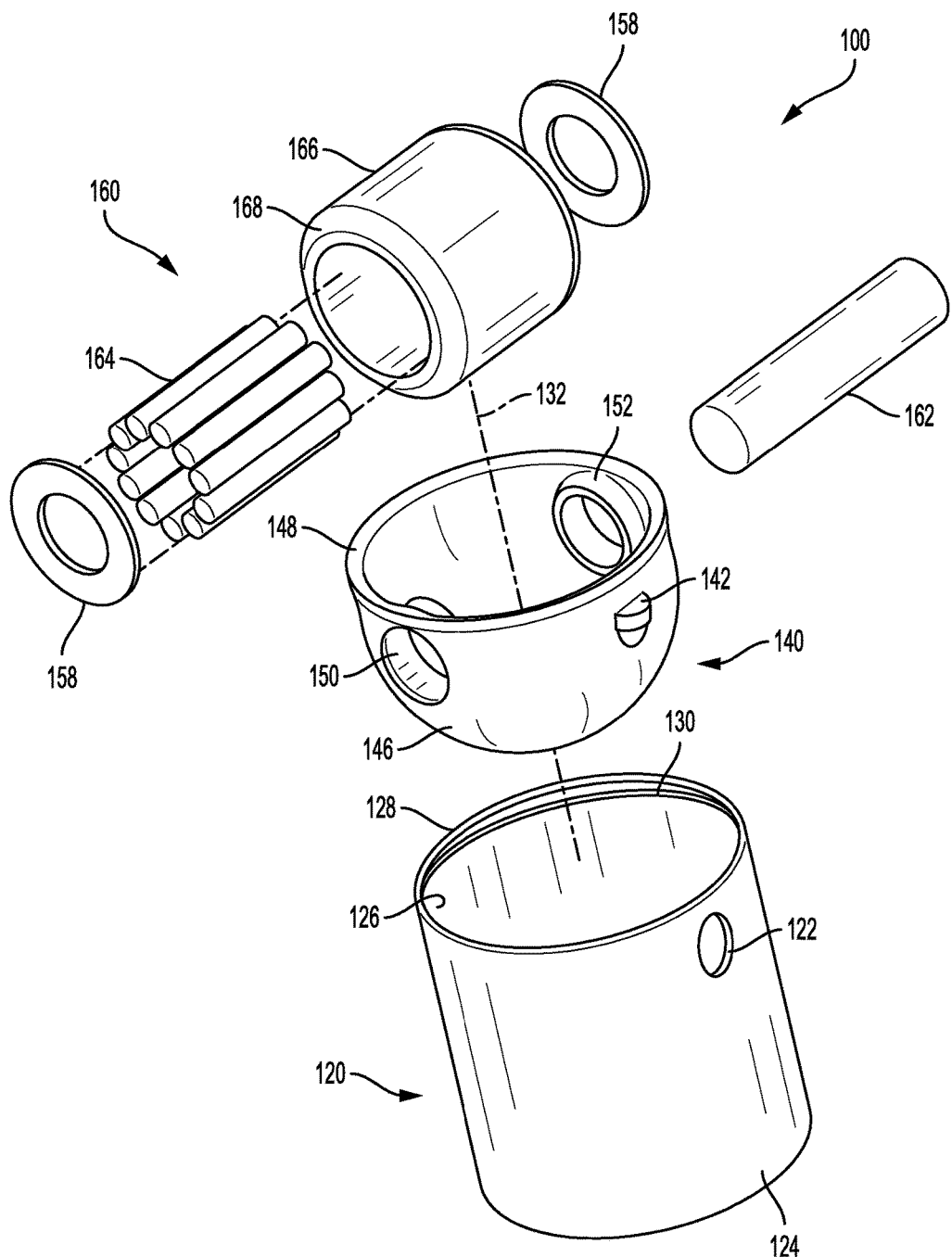
FIG. 2 is an exploded perspective view of the follower mechanism shown in FIGS. 1A and 1B.

As best seen in FIG. 2, roller follower 160 includes shaft 162, an outer race 166, and a plurality of rollers 164 disposed therebetween such that race 166 is freely rotatable about shaft 162. Opposite ends of shaft 162 are received in shaft apertures 150 of inner cup 140 such that roller follower 160 is mounted to outer cup 120 of follower mechanism 100 by way of the inner cup. When assembled, roller follower 160 extends axially outwardly beyond the top edge of outer cup 120 such that outer surface of race 166 engages a corresponding lobe 184 of camshaft 182, as shown in FIG. 6. Preferably, the diameters of shaft apertures 150 are slightly larger than the diameter of shaft 162 such that shaft 162 is free to rotate within shaft apertures 150 during operation. Alternately, the opposing ends of shaft 162 can be staked, swaged, etc., to inner cup 140 such that rotation relative thereto is prevented. Note, when shaft 162 is free to rotate within shaft apertures 150, the axial motion of shaft 162 is limited by abutment at either end with inner surface 126 of outer cup 120. Preferably, a washer 158 is disposed at each end of race 160 to limit the motion of both race 160 and rollers 164 along shaft 162. Preferably, annular beveled edges 168 are provided on the opposite ends of outer race 166 to allow the overall size of outer race 166 to be maximized, yet not make contact with the inner surface of semi-spherical bottom portion 146 of inner cup 140.

As shown in FIGS. 7A through 9C, an alternate embodiment of a follower mechanism 200 in accordance with the present disclosure includes a substantially cylindrical outer cup 220, an inner cup 240 received therein, a roller follower 260 supported by inner cup 240, and an alignment device 242 extending through a slot 222 formed in outer cup 220. Similarly to the previously described embodiment, follower mechanism 200 may be used in a high-pressure fuel pump 180 (FIG. 6) of an internal combustion engine, although other uses for follower mechanism 200 are possible.

Figure 11:
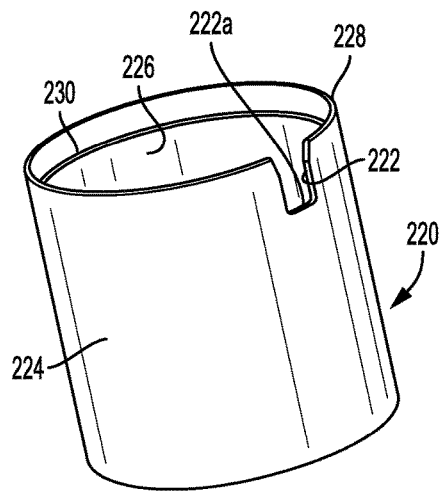
FIG. 11 is a perspective view of an outer cup of the follower mechanism shown in FIGS. 7A and 7B.
Figure 12A:
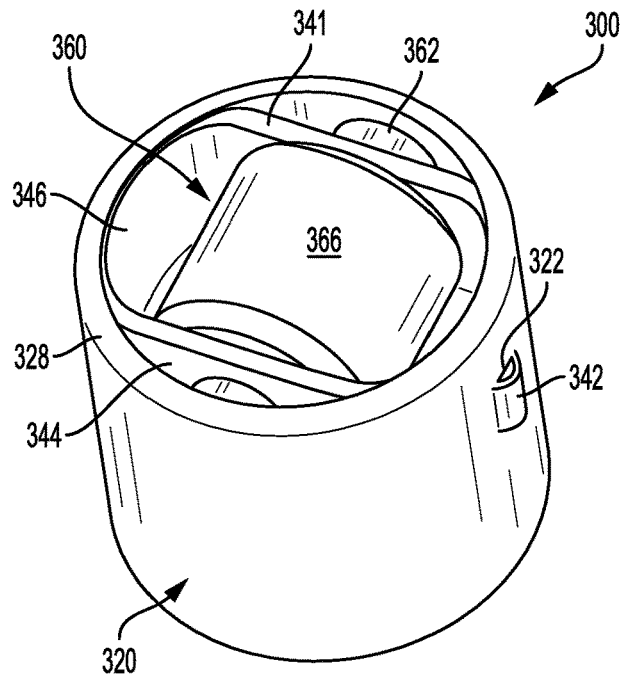
FIGS. 12A and 12B are perspective views of an alternate embodiment of a follower mechanism in accordance with the present disclosure.
Figure 12B:
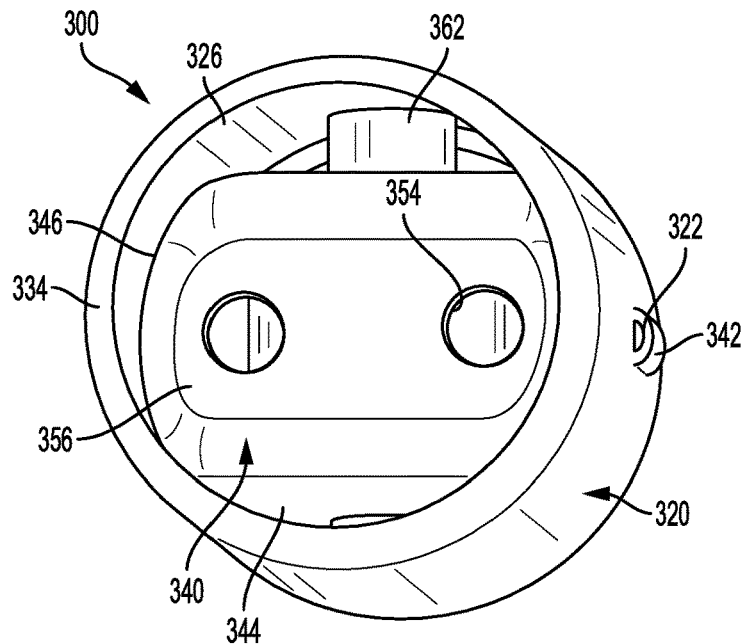

Referring additionally to FIG. 11, outer cup 220 includes a cylindrical outer surface 224, a cylindrical inner surface 226 substantially concentric therewith, and slot 222 defined in annular lip 228 for slidably receiving alignment device 242. As shown, slot 222 is generally U-shaped having a flat bottom edge 222a. However, bottom edge 222a may also be semi-circular, curved, etc., in shape. Outer cup 220 is preferably formed from a sheet metal blank of low, medium or high carbon plain or alloy steel by a stamping process, or deep drawing process using a multi-station transfer or progressive press, in which case slot 222 is preferably formed by piercing, although it may be machined or otherwise cut into outer cup 220. Additionally, outer cup 220 includes an annular lip 228 and 234 formed at each of its opposing ends. Annular lip 228 is thinner in the radial direction than the remaining side wall of outer cup 220, forming an annular ledge 230 therewith. Prior to fully assembling follower mechanism 200, annular lip 228 extends axially outwardly parallel to a longitudinal center axis 232 of outer cup 220, whereas annular ledge 230 lies in a plane that is transverse to longitudinal center axis 232. When forming outer cup 220, annular lip 234 may be initially formed depending radially inwardly as the other components of the roller follower are preferably placed into outer cup 220 from the end at which annular lip 228 is disposed.

Figure 7A:
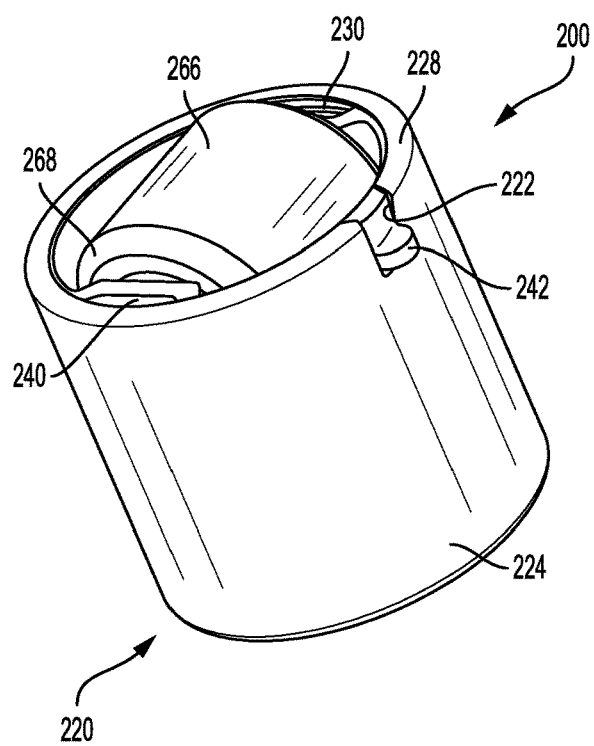
FIGS. 7A and 7B are perspective views of another alternate embodiment of a follower mechanism in accordance with the present disclosure.
Figure 7B:
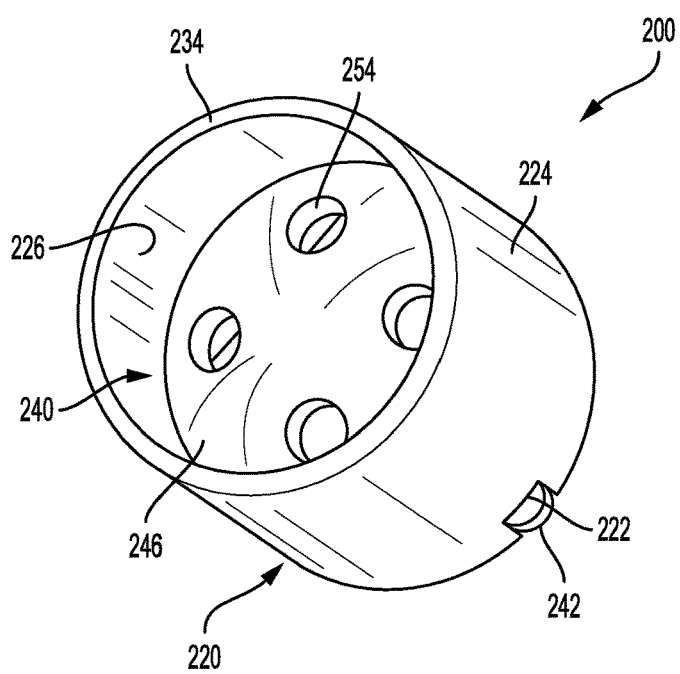
Figure 9A:
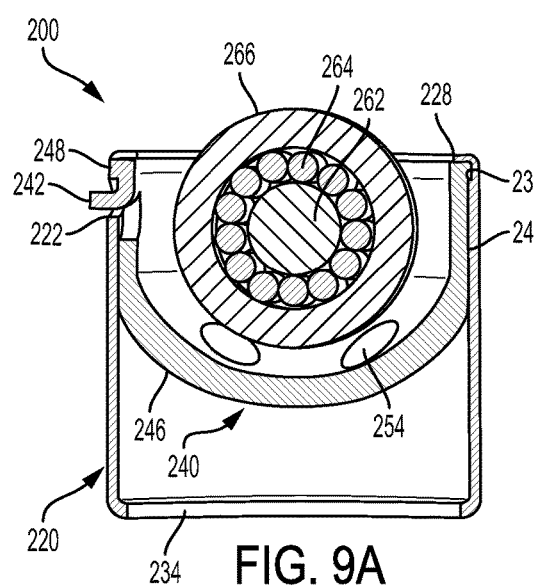
FIGS. 9A, 9B, 9C and 9D are cross-sectional views of the follower mechanism shown in FIGS. 7A and 7B.
Figure 9B:
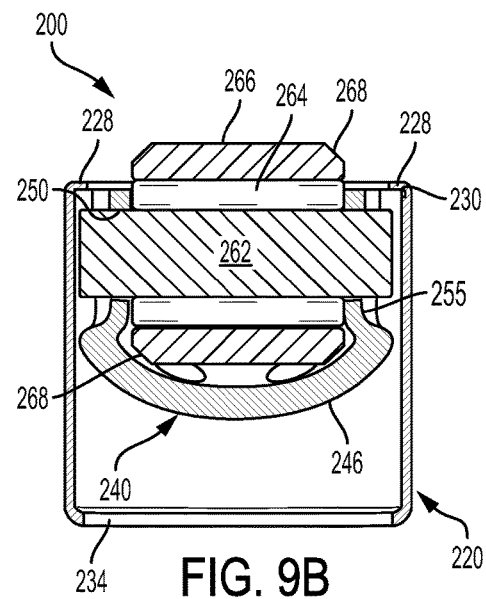
Figure 9C:
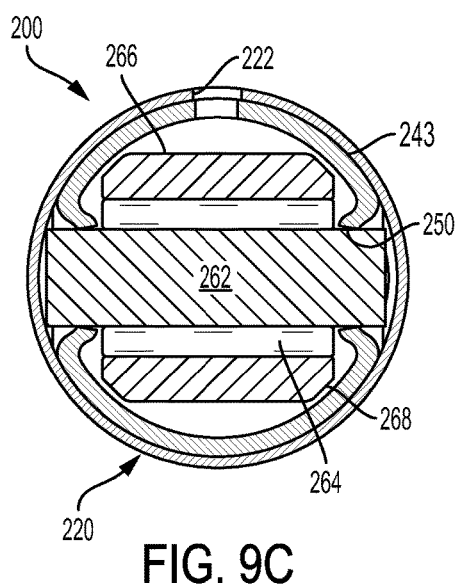
Figure 9D:
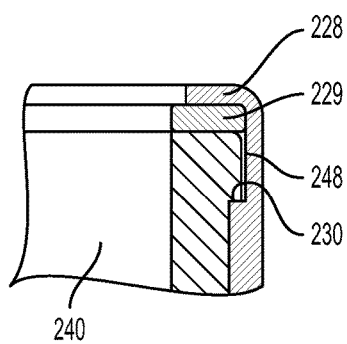
Figure 10A:
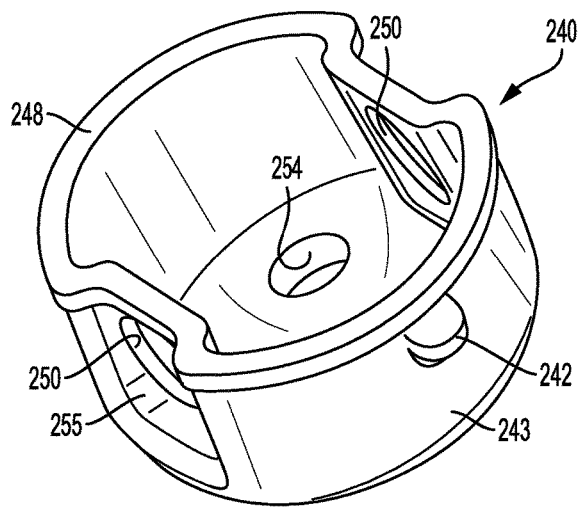
FIGS. 10A and 10B are perspective views of an inner cup of the follower mechanism shown in FIGS. 7A and 7B.
Figure 10B:
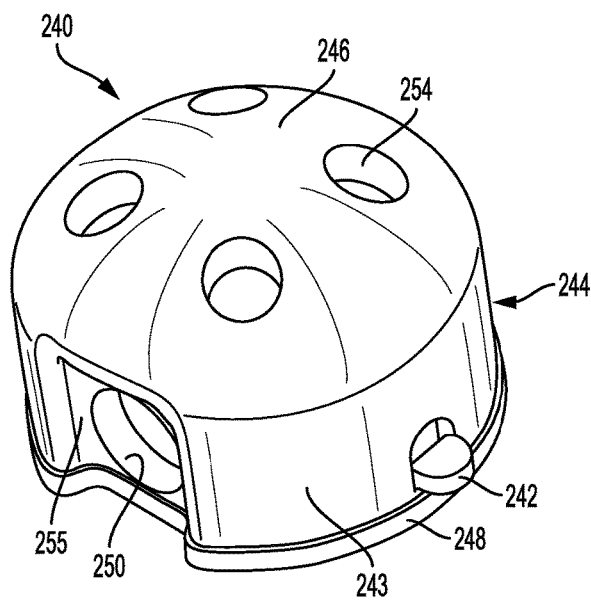

Referring additionally to FIGS. 10A and 10B, inner cup 240 preferably includes a side wall 244 including two opposed curved portions 243 with two parallel side portions 255 extending therebetween, a semi-spherical bottom portion 246, an upper lip 248 extending radially outwardly from an upper perimeter of side wall 244, a pair of shaft apertures 250 defined by side wall 244, and alignment tab 242 extending outwardly from the side wall. As best seen in FIGS. 7A, 9A and 9B, when fully inserted in outer cup 220, upper lip 248 of inner cup 240 rests on annular ledge 230 of outer cup 220 and alignment tab 242 extends outwardly from alignment slot 222. Note, inner cup 240 may be inserted directly into outer cup 220 without tilting since slot 222 is open at the perimeter of annular lip 228 so that alignment tab 242 may be slid directly therein.

Once fully inserted in outer cup 220 and rotationally positioned by way of alignment tab 242, inner cup 240 is retained therein by folding annular lip 228 over inwardly, such as by crimping, spin curling, punch forming, etc., so that upper lip 248 is non-rotatably squeezed between annular lip 228 and annular ledge 230. Note, in alternate embodiments, a spacer 229 may be positioned between annular lip 228 and annular ledge 230. Spacer 229 helps insure that any potential gaps between lip 228 and ledge 230 are minimized. Spacer 229 is preferably formed from a plastic or a like material. Note, since outer cup 220 does not directly support shaft 262 of roller follower 260, it does not require the heat treatment processes that are typically performed on the outer cups of known follower mechanisms. As such, the folding/crimping operation performed on annular lip 228 is facilitated. However, in those applications where heat treatment of outer cup 220 is desired for wear purposes, the heat treatment process occurs after alignment slot 222 is formed. Next, prior to folding, crimping, etc., annular lip 228 over inwardly, annular lip 228 is tempered to facilitate the operation and help prevent cracking.

Preferably, inner cup 240 is formed from a sheet metal blank by a stamping process, or drawing process, and is subjected to heat treatment processes as it directly supports shaft 262 of follower mechanism 200. Initially, side wall 244 is substantially cylindrical when inner cup 240 is formed. However, prior to the heat treatment process, flat side portions 245 are formed, resulting in the side portions 245 extending between two opposed curved portions 243. As well, prior to the heat treatment processes, shaft apertures 250 are pierced in flat side portions 245 of inner cup 240. Lubrication apertures 254 are also pierced in semi-spherical bottom portion 246 of inner cup 240 prior to any heat treatment processes. As shown, alignment tab 242 includes a rounded distal end that is correspondingly shaped to the alignment groove (not shown) that is formed in the corresponding cylinder head 188 (FIG. 6). Although not shown, similarly to the first embodiment (FIGS. 1A and 1B), a portion of semi-spherical bottom portion 246 may be flattened, thereby forming a bottom wall that is perpendicular to longitudinal center axis 232 of follower mechanism 200.

Figure 8:
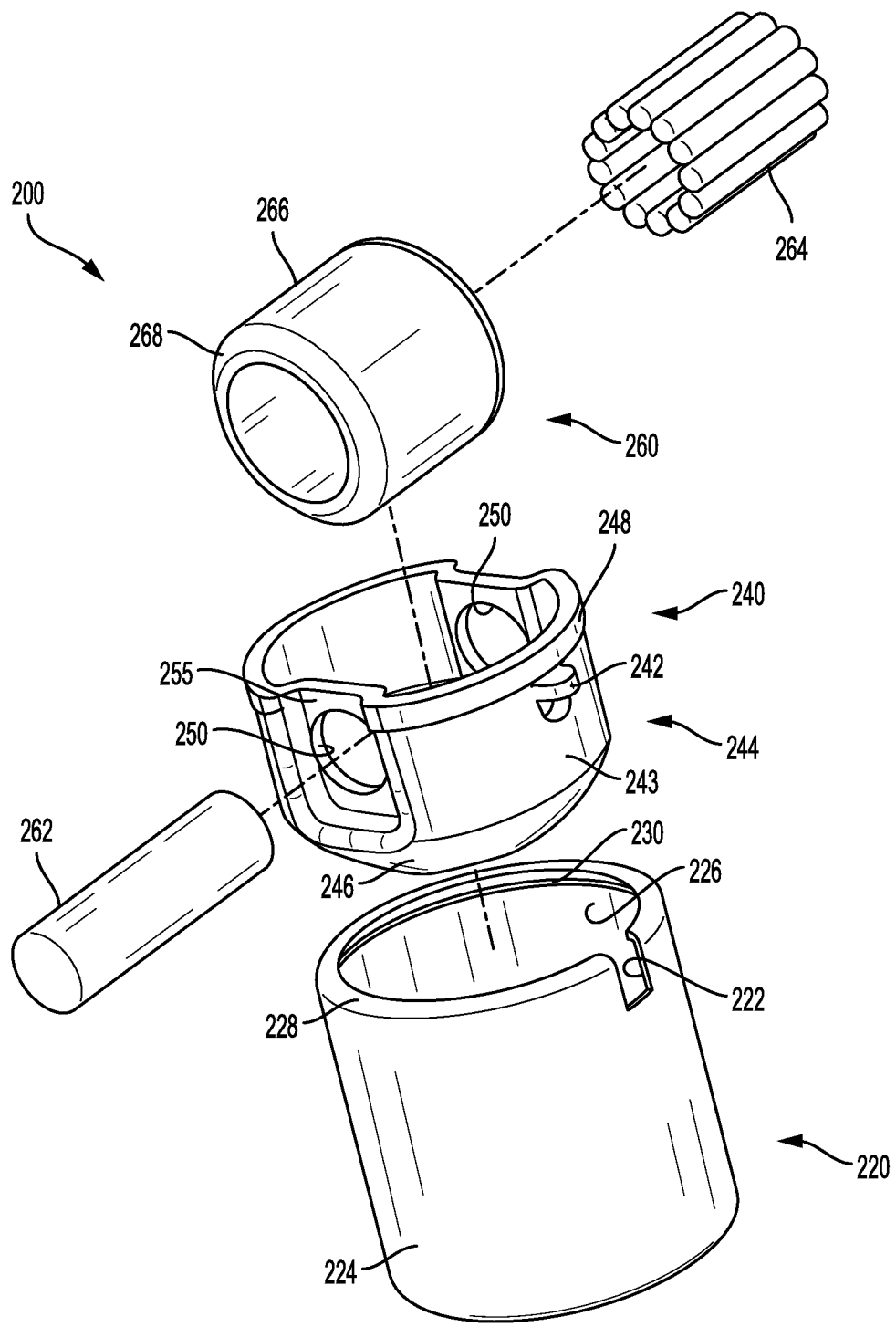
FIG. 8 is an exploded perspective view of the follower mechanism shown in FIGS. 7A and 7B.

As best seen in FIG. 8, roller follower 260 includes shaft 262, an outer race 266, and a plurality of rollers 264 disposed therebetween such that race 266 is freely rotatable about shaft 262. Opposite ends of shaft 262 are received in shaft apertures 250 of inner cup 240. When assembled, roller follower 260 extends axially outwardly beyond the top edge of outer cup 220 such that outer surface of race 266 engages a corresponding lobe 184 of camshaft 182, as shown in FIG. 6. Preferably, the diameters of shaft apertures 250 are slightly larger than the diameter of shaft 262 such that shaft 262 is free to rotate therein. Alternately, the opposing ends of shaft 262 can be staked, swaged, etc., to inner cup 240 such that rotation relative thereto is prevented. Note, when shaft 262 is free to rotate within shaft apertures 250, the axial motion of shaft 262 is limited by abutment at either end with inner surface 226 of outer cup 220. Note, unlike the previously discussed embodiment, the flat inner surfaces of parallel side portions 255 of inner cup 240 negate the need for washers at opposite ends of rollers 264. Preferably, annular beveled edges 268 are provided on the opposite ends of outer race 266 to allow the overall size of outer race 266 to be maximized, yet not make contact with the rounded bottom corners of inner cup 240.

As shown in FIGS. 12A through 14B, an alternate embodiment of a follower mechanism 300 in accordance with the present disclosure includes a substantially cylindrical outer cup 320, an inner cup 340 received therein, a roller follower 360 supported by inner cup 340, and an alignment device 342 formed on outer cup 320. Similarly to the previously described embodiments, follower mechanism 300 may be used in a high-pressure fuel pump 180 (FIG. 6) of an internal combustion engine, although other uses for follower mechanism 300 are possible.

Figure 16:
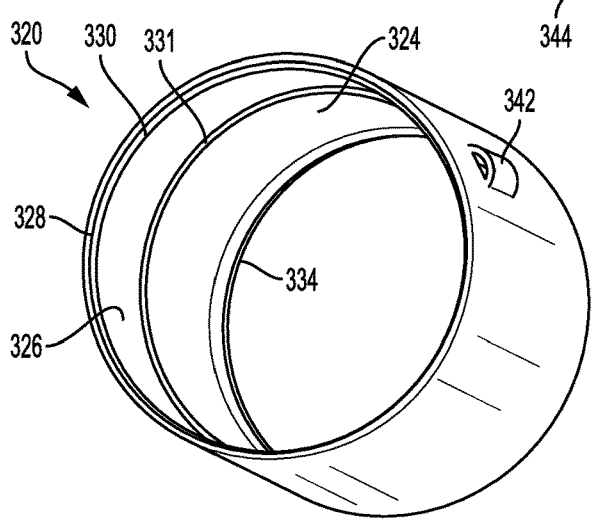
FIG. 16 is a perspective view of an outer cup of the follower mechanism shown in FIGS. 12A and 12B.
Figure 17A:
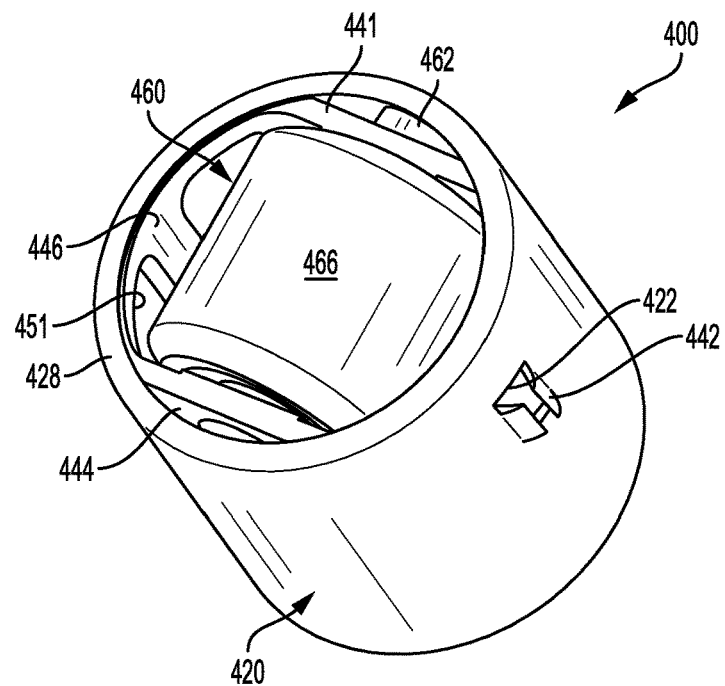
FIGS. 17A and 17B are perspective views of another alternate embodiment of a follower mechanism in accordance with the present disclosure.
Figure 17B:
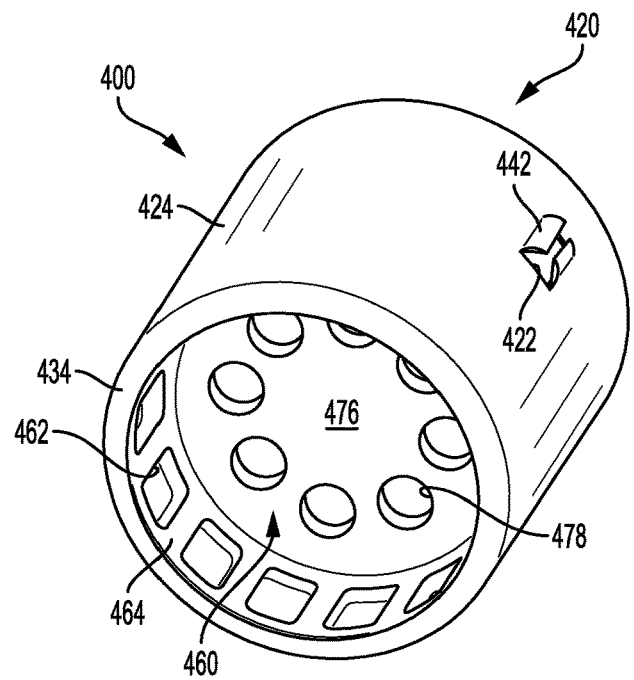

Referring additionally to FIG. 16, outer cup 320 includes a cylindrical outer surface, a cylindrical inner surface 324/326 substantially concentric therewith, and alignment device 342. Outer cup 320 is preferably formed from a sheet metal blank of low, medium or high carbon plain or alloy steel by a stamping process, or deep drawing process using a multi-station transfer or progressive press. Semi-circular alignment feature 342 is preferably lanced or formed into the side wall of outer cup 320 prior to any heat treatment processes.

Outer cup 320 includes an annular lip 328 and 334 formed at each of its opposing ends. Annular lip 328 is thinner in the radial direction than a first wall portion 324 of the side wall, forming an annular ledge 330 therewith. Prior to fully assembling follower mechanism 300, annular lip 328 extends axially outwardly parallel to a longitudinal center axis 332 of outer cup 320, whereas annular ledge 330 lies in a plane that is transverse to longitudinal center axis 332. When forming outer cup 320, annular lip 334 may be initially formed depending radially inwardly as the other components of the roller follower are preferably placed into outer cup 320 from the end at which annular lip 328 is disposed. Additionally, a ledge 331, or seat, for receiving a corresponding pair of ledges 348 formed on an outer surface of inner cup 340 is disposed between first wall portion 324 and second wall portion 326 of the inner surface of outer cup 320. Ledge 331 lies in a plane that is perpendicular to longitudinal center axis 332 of follower mechanism 300.

Figure 14A:
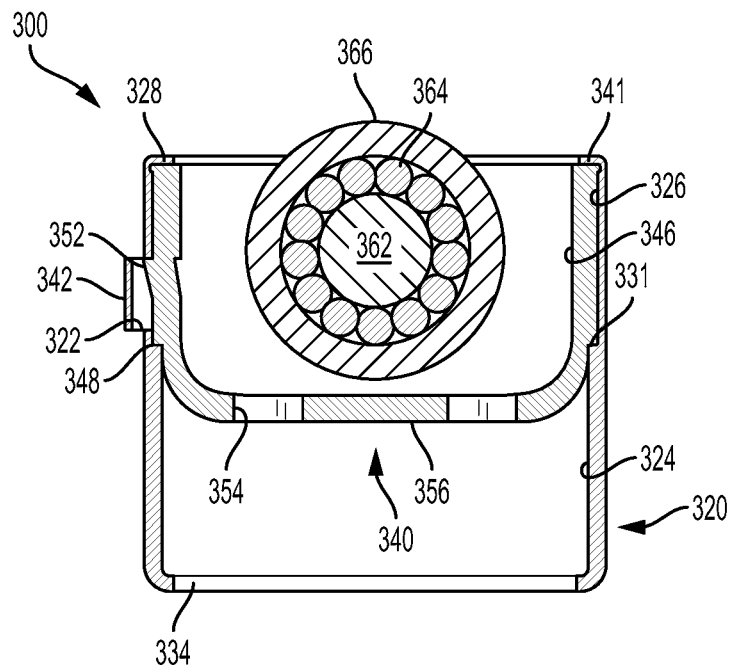
FIGS. 14A and 14B are cross-sectional views of the follower mechanism shown in FIGS. 12A and 12B.
Figure 14B:
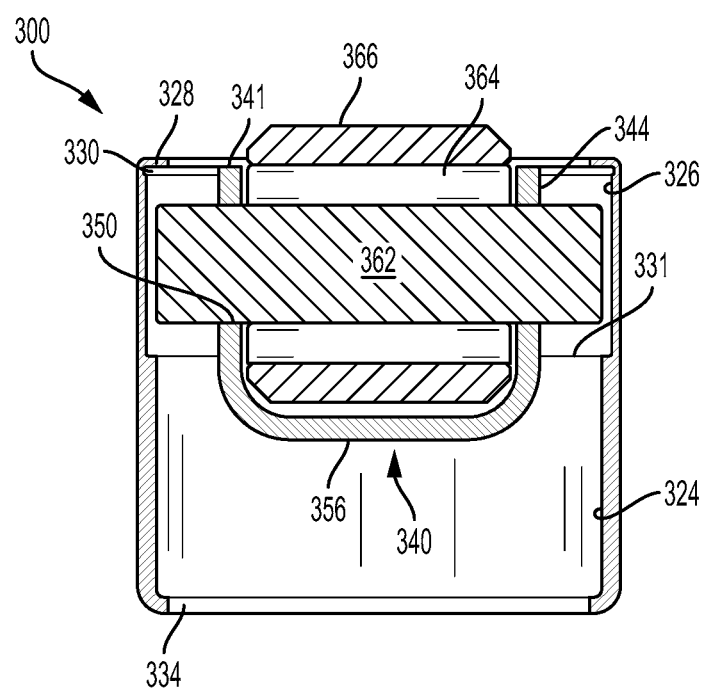
Figure 15A:
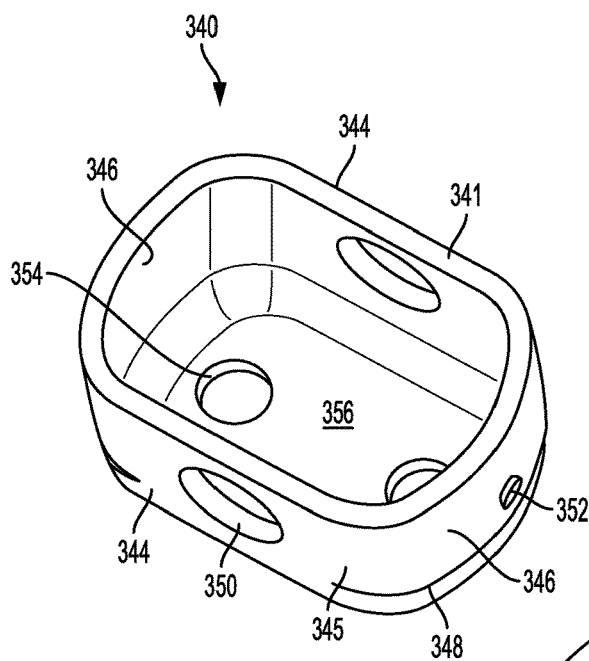
FIGS. 15A and 15B are perspective views of an inner cup of the follower mechanism shown in FIGS. 12A and 12B.
Figure 15B:
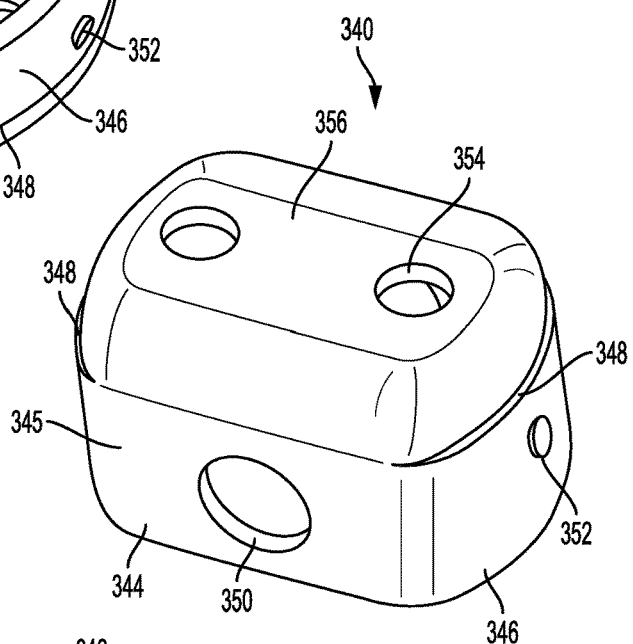

Referring additionally to FIGS. 15A and 15B, inner cup 340 preferably includes a side wall 345 including two opposed curved portions 346 with two parallel side portions 344 extending therebetween, a bottom wall 356, a pair of shaft apertures 350 defined by side walls 344, and a retainer tab 352 disposed on one of the side wall's curved portions 346. As best seen in FIG. 14A, when fully inserted in outer cup 320, ledges 348 of inner cup 340 rest on annular ledge 331 of outer cup 320 and retainer tab 352 extends outwardly into an aperture in the side wall of outer cup 320 that results from forming alignment feature 342. Note, inner cup 340 may be inserted directly into outer cup 320 with minimal force as alignment tab 352 is angled so that it cams the side wall of outer cup 320 outwardly until it engages the aperture of alignment feature 342. Once fully inserted in outer cup 320 and rotationally positioned by way of retainer tab 352, inner cup 340 is retained therein by folding annular lip 328 over inwardly, such as by crimping, spin curling, punch forming, etc., until annular lip 328 engages an upper surface 341 of the inner cup's curved side wall portions 346. As such, inner cup 340 is non-rotatably squeezed between annular lip 328 and annular ledge 331. Note, since outer cup 320 does not directly support shaft 362 of roller follower 360, it does not require the heat treatment processes that are typically performed on the outer cups of known follower mechanisms. As such, the folding/crimping operation performed on annular lip 328 is facilitated. However, in those applications where heat treatment of outer cup 320 is desired for wear purposes, the heat treatment process occurs after alignment feature 342 is formed. Next, prior to folding, crimping, etc., annular lip 328 over inwardly, annular lip 328 is tempered to facilitate the operation and help prevent cracking.

Preferably, inner cup 340 is formed from a sheet metal blank of low, medium or high carbon plain or alloy steel by a stamping process, or deep drawing process using a multi-station transfer or progressive press, and is subjected to heat treatment processes as it directly supports shaft 362 of follower mechanism 300. Prior to the heat treatment processes, shaft apertures 350 are pierced in flat side wall portions 344 of inner cup 340. Lubrication apertures 354 are also pierced in bottom wall 356 of inner cup 340 prior to any heat treatment processes. As shown, preferably, bottom wall 356 is flat and perpendicular to longitudinal center axis 332 of follower mechanism 300. Bottom wall 356 facilitates the transfer of forces from follower mechanism 300 to the corresponding pump stem, valve stem, etc.

Figure 13:
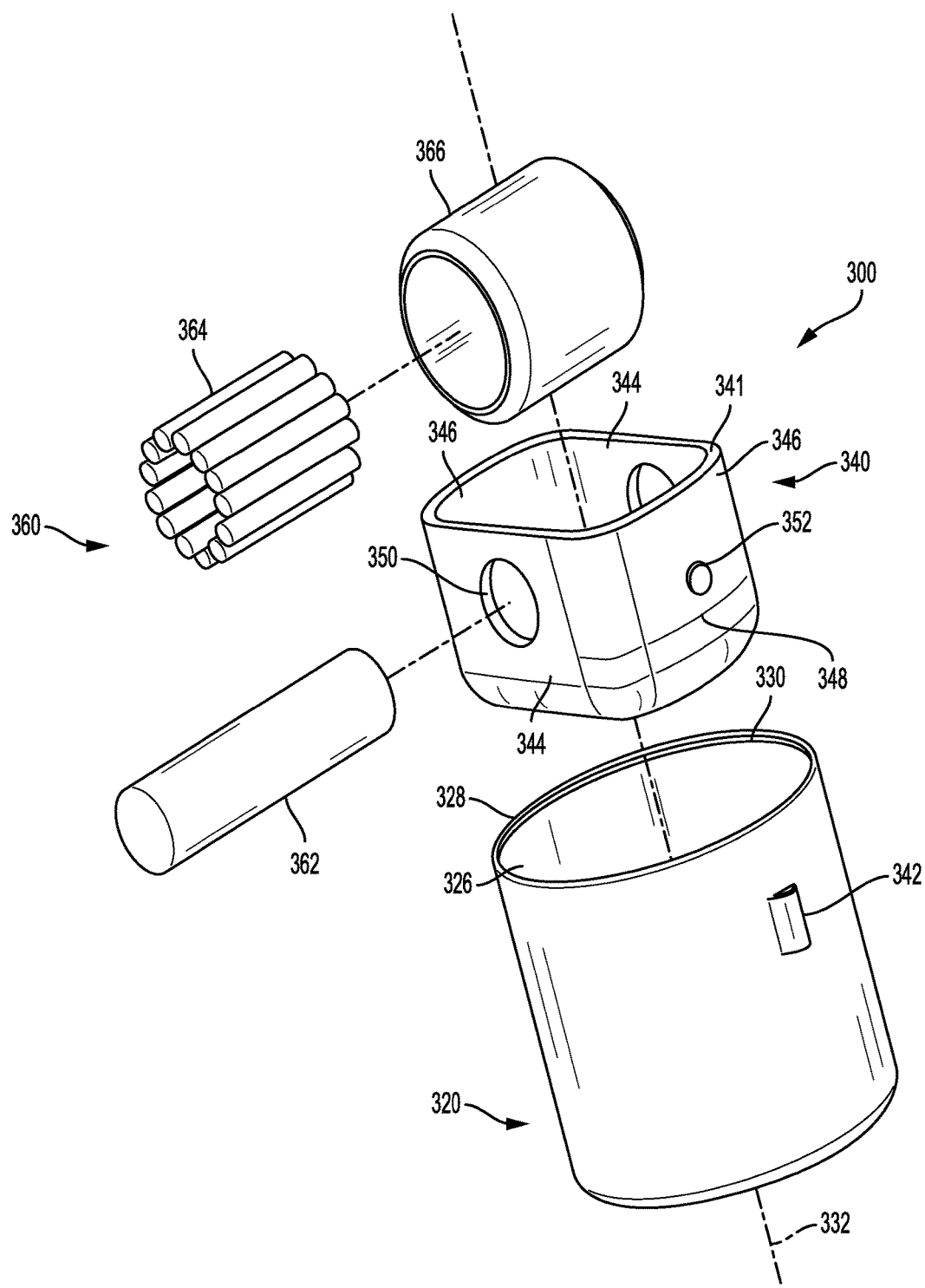
FIG. 13 is an exploded perspective view of the follower mechanism shown in FIGS. 12A and 12B.

As best seen in FIG. 13, roller follower 360 includes shaft 362, an outer race 366, and a plurality of rollers 364 disposed therebetween such that race 366 is freely rotatable about shaft 362. Opposite ends of shaft 362 are received in shaft apertures 350 of inner cup 340. When assembled, roller follower 360 extends axially outwardly beyond the top edge of outer cup 320 such that outer surface of race 366 engages a corresponding lobe 184 of camshaft 182, as shown in FIG. 6. Preferably, the diameters of shaft apertures 350 are slightly larger than the diameter of shaft 362 such that shaft 362 is free to rotate therein. Alternately, the opposing ends of shaft 362 can be staked, swaged, etc., to inner cup 340 such that rotation relative thereto is prevented. Note, when shaft 362 is free to rotate within shaft apertures 350, the axial motion of shaft 362 is limited by abutment at either end with inner surface 326 of outer cup 320. Preferably, the flat inner surfaces of parallel side wall portions 344 of inner cup 340 act as bearing surfaces for the ends of rollers 364, thereby negating the need for washers at opposite ends of rollers 364. Preferably, annular beveled edges 368 are provided on the opposite ends of outer race 366 to allow the overall size of outer race 366 to be maximized, yet not make contact with the rounded bottom corners of inner cup 340.

As shown in FIGS. 17A through 19B, an alternate embodiment of a follower mechanism 400 in accordance with the present disclosure includes a substantially cylindrical outer cup 420, an inner cup 440 received therein, a spacer element 470, a roller follower 460 supported by inner cup 440, and an alignment device 442 formed on outer cup 420. Similarly to the previously described embodiments, follower mechanism 400 may be used in a high-pressure fuel pump 180 (FIG. 6) of an internal combustion engine, although other uses for follower mechanism 400 are possible.

Figure 22:
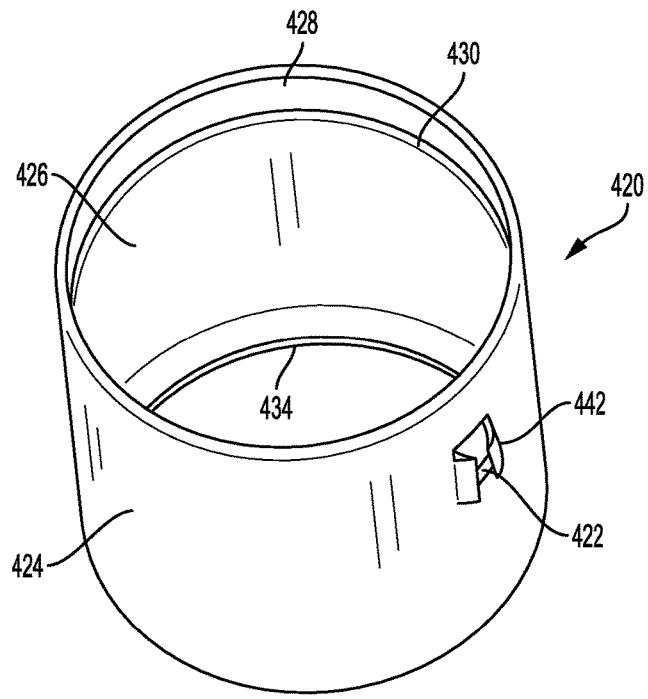
FIG. 22 is a perspective view of an outer cup of the follower mechanism shown in FIGS. 17A and 17B.

Referring additionally to FIG. 22, outer cup 420 includes a cylindrical outer surface 424, a cylindrical inner surface 426 substantially concentric therewith, and alignment device 442. Outer cup 420 is preferably formed from a sheet metal blank of low or medium carbon plain or alloy steel by a stamping process, or deep drawing process using a multi-station transfer or progressive press. Semi-circular alignment feature 442 is preferably pierced into the side wall of outer cup 420 prior to any heat treatment processes. Specifically, a dog-bone shaped aperture 422 is pierced in the side wall which provides two projections that are later bent radially outward by forming, resulting in alignment feature 442.

Outer cup 420 includes an annular lip 428 and 434 formed at each of its opposing ends. Annular lip 428 is thinner in the radial direction than the side wall of outer cup 420, forming an annular ledge 430 therewith. Prior to fully assembling follower mechanism 400, annular lip 428 extends axially outwardly parallel to a longitudinal center axis 432 of outer cup 420, whereas annular ledge 430 lies in a plane that is transverse to longitudinal center axis 432. When forming outer cup 420, annular lip 434 may be initially formed depending radially inwardly as the other components of the roller follower are preferably placed into outer cup 420 from the end at which annular lip 428 is disposed. Unlike the previously described embodiments, outer cup 420 does not include a ledge formed on its inner surface 426 that is configured to support inner cup 440. Rather, follower mechanism 400 includes a spacer element 470 that supports inner cup 440 within outer cup 420, as described below.

Figure 19A:
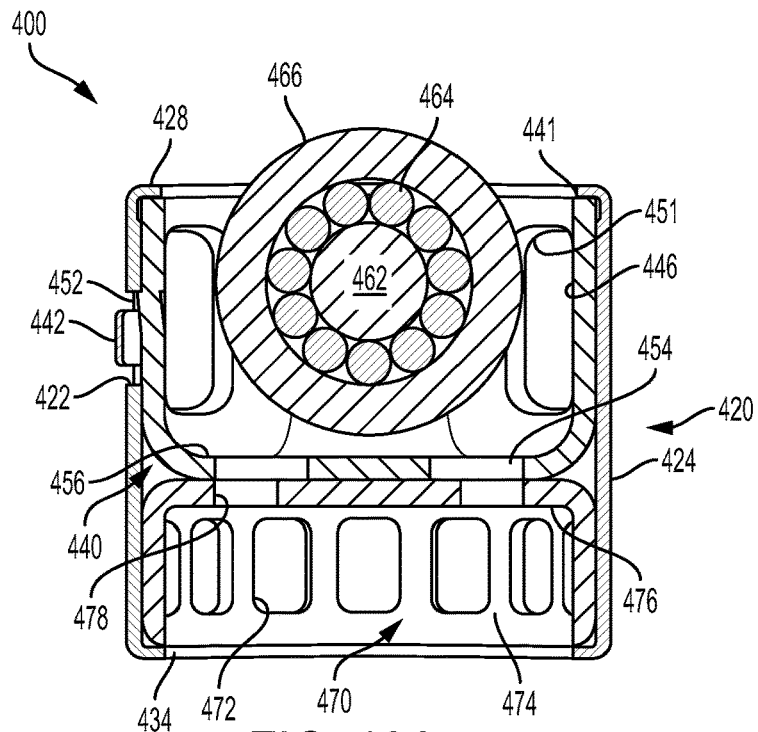
FIGS. 19A and 19B are cross-sectional views of the follower mechanism shown in FIGS. 17A and 17B.
Figure 19B:
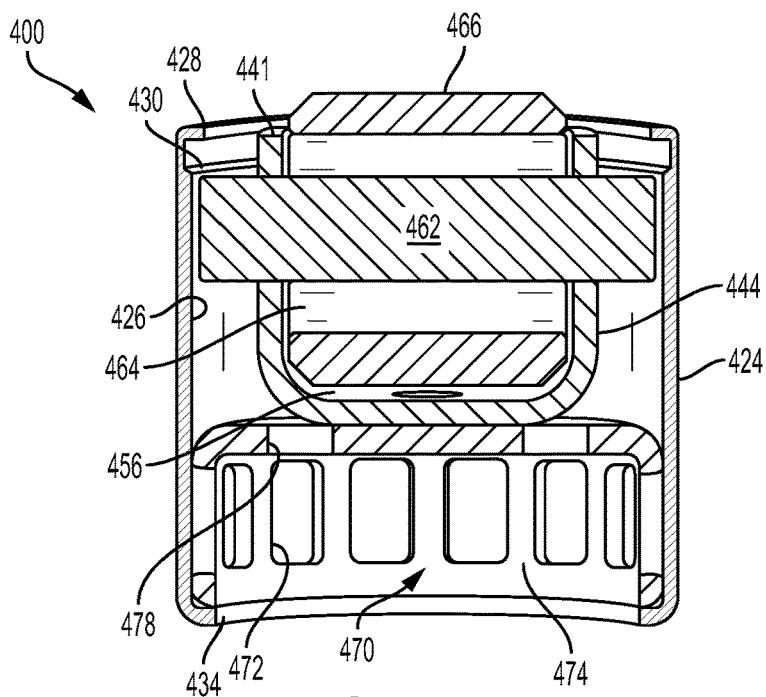
Figure 21:
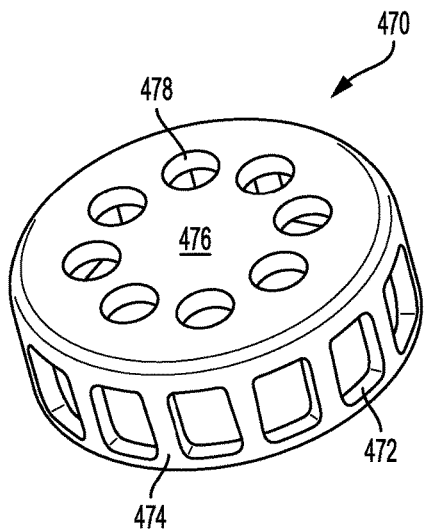
FIG. 21 is a perspective view of a spacer of the follower mechanism shown in FIGS. 17A and 17B.

Referring additionally to FIGS. 19A, 19B and 21, spacer element 470 preferably includes a cylindrical side wall 474 including a plurality of apertures 472 formed therein, and an upper wall 476 including a plurality of lubrication apertures 478 formed therein. As best seen in FIGS. 19A and 19B, when fully inserted in outer cup 420, a bottom edge of side wall 474 abuts annular lip 434 so that upper wall 476 is traverse to longitudinal center axis 432 and positioned to support inner cup 440 in outer cup 420.

Preferably, spacer element 470 is formed from a sheet metal blank of low, medium or high carbon plain or alloy steel by a stamping process, or deep drawing process using a multi-station transfer or progressive press, and is not subjected to heat treatment processes as it does not directly support shaft 462 of follower mechanism 400. Apertures 472 are pierced in side wall 474 of spacer element 470 as a means of reducing the overall weight of follower mechanism 400. Lubrication apertures 478 are also pierced in upper wall 476 of spacer element 470 so that they at least partially align with lubrication apertures 454 formed in bottom wall 456 of inner cup 440. As shown, preferably, upper wall 476 is flat and perpendicular to longitudinal center axis 432 of follower mechanism 400 to facilitate the transfer of forces from follower mechanism 400 to the corresponding pump stem, valve stem, etc.

Figure 20:
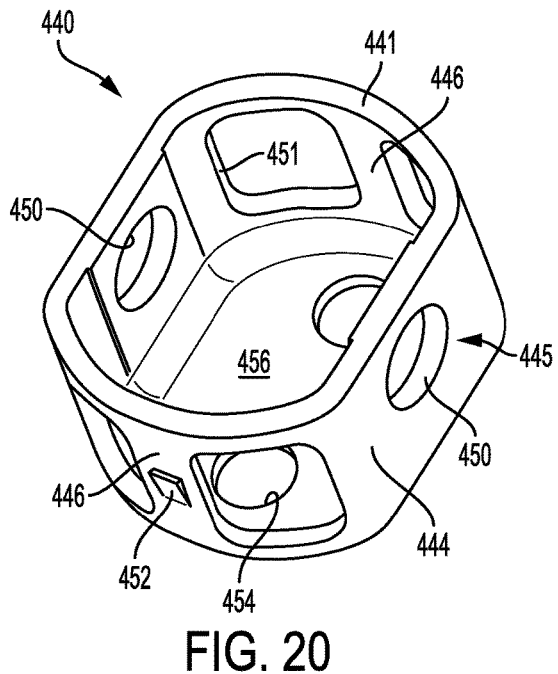
FIG. 20 is a perspective view of an inner cup of the follower mechanism shown in FIGS. 17A and 17B.

Referring additionally to FIG. 20, inner cup 440 preferably includes a side wall 445 including two opposed curved portions 446 with two parallel side portions 444 extending therebetween, a plurality of apertures 451 defined in the side wall, a bottom wall 456, a pair of shaft apertures 450 defined by side walls 444, and a retainer tab 452 disposed on one of the side wall's curved portions 446. As best seen in FIG. 19A, when fully inserted in outer cup 420, bottom wall 456 of inner cup 440 rests on upper wall 476 of spacer element 470 and retainer tab 452 extends outwardly into aperture 422 in the side wall of outer cup 420 that results from forming alignment feature 442. Note, inner cup 440 may be inserted directly into outer cup 420 with minimal force as alignment tab 452 is angled so that it cams the side wall of outer cup 420 outwardly until it engages the aperture of alignment feature 442. Once fully inserted in outer cup 420 and rotationally positioned by way of retainer tab 452, inner cup 440 is retained therein by folding annular lip 428 over inwardly, such as by crimping, spin curling, punch forming, etc., until annular lip 428 engages an upper surface 441 of the inner cup's curved side wall portions 446. As such, inner cup 440 is non-rotatably squeezed between annular lip 428 and spacer element 470, which abuts annular ledge 434. Note, since outer cup 420 does not directly support shaft 462 of roller follower 460, it does not require the heat treatment processes that are typically performed on the outer cups of known follower mechanisms. As such, the folding/crimping operation performed on annular lip 428 is facilitated. However, in those applications where heat treatment of outer cup 420 is desired for wear purposes, the heat treatment process occurs after aperture 422 of alignment feature 442 is formed by piercing. Next, prior to folding, crimping, etc., annular lip 428 over inwardly, annular lip 428 is tempered to facilitate the operation and help prevent cracking.

Preferably, inner cup 440 is formed from a sheet metal blank of low, medium or high carbon plain or alloy steel by a stamping process, or deep drawing process using a multi-station transfer or progressive press, and is subjected to heat treatment processes as it directly supports shaft 462 of follower mechanism 400. Prior to the heat treatment processes, shaft apertures 450 are pierced in flat side wall portions 444 of inner cup 440 as are apertures 451 in curved side wall portions 446. Lubrication apertures 454 are also pierced in bottom wall 456 of inner cup 440 prior to any heat treatment processes. As shown, preferably, bottom wall 356 is flat and perpendicular to longitudinal center axis 432 of follower mechanism 400. Bottom wall 456 facilitates the transfer of forces from roller follower 460 to spacer element 470 and, therefore, the corresponding pump stem, valve stem, etc.

Figure 18:
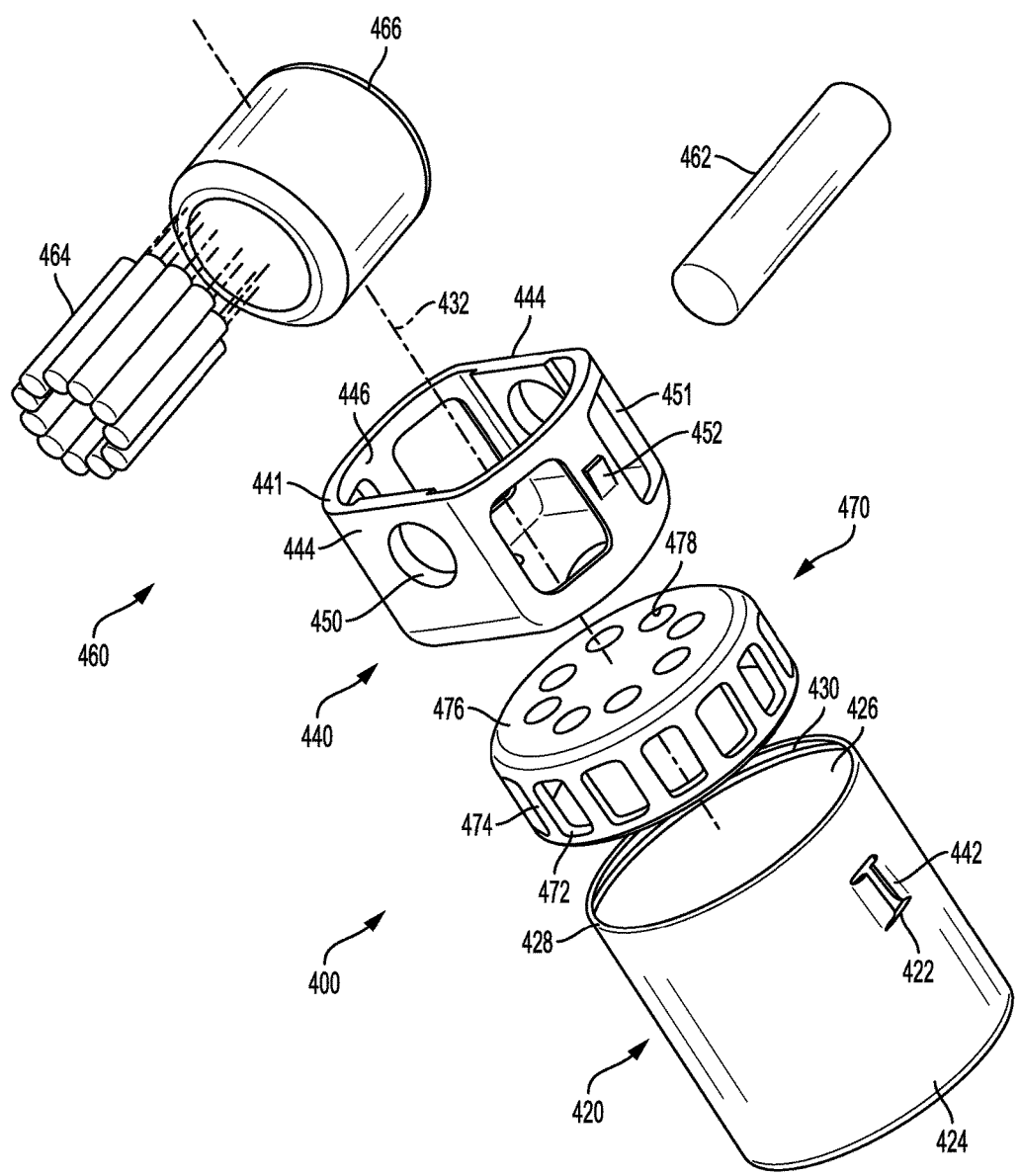
FIG. 18 is an exploded perspective view of the follower mechanism shown in FIGS. 17A and 17B.

As best seen in FIG. 18, roller follower 460 includes shaft 462, an outer race 466, and a plurality of rollers 464 disposed therebetween such that race 466 is freely rotatable about shaft 462. Opposite ends of shaft 462 are received in shaft apertures 450 of inner cup 440. When assembled, roller follower 460 extends axially outwardly beyond the top edge of outer cup 420 such that outer surface of race 466 engages a corresponding lobe 184 of camshaft 182, as shown in FIG. 6. Preferably, the diameters of shaft apertures 450 are slightly larger than the diameter of shaft 462 such that shaft 462 is free to rotate therein. Alternately, the opposing ends of shaft 462 can be staked, swaged, etc., to inner cup 440 such that rotation relative thereto is prevented. Note, when shaft 462 is free to rotate within shaft apertures 450, the axial motion of shaft 462 is limited by abutment at either end with inner surface 426 of outer cup 420. Note, the flat inner surfaces of parallel side wall portions 444 of inner cup 440 negate the need for washers at opposite ends of rollers 464. Preferably, annular beveled edges 468 are provided on the opposite ends of outer race 466 to allow the overall size of outer race 466 to be maximized, yet not make contact with the rounded bottom corners of inner cup 440.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A follower mechanism movable within a bore along a longitudinal center axis of the bore, comprising:
   an outer cup having an inner surface and an outer surface defining a substantially cylindrical side wall, a first annular lip portion disposed at a first end of the side wall, and a second annular lip portion disposed at a second end of the side wall, wherein the first and second annular lip portions extend radially and inwardly from the side wall;
   a spacer element including a cylindrical side wall, a top wall extending inwardly from a first end of the sidewall, and a bottom edge disposed along a second end of the side wall, wherein the spacer element is disposed inside the outer cup with its bottom edge adjacent the second annular lip portion of the outer cup;
   an inner cup including a pair of shaft apertures, the inner cup being disposed in the outer cup so that a bottom surface of the inner cup abuts the top wall of the spacer element and is axially fixed thereto by the second annular lip portion of the outer cup which abuts a top edge of the inner cup;
   a shaft having a first end and a second end, each of the first end and the second end being disposed in a corresponding one of the shaft apertures; and
   a roller follower rotatably received on the shaft such that a portion of the roller follower extends axially outwardly beyond the annular lip portion of the outer cup.

2. The follower mechanism of claim 1, wherein the inner cup further comprises a side wall including two opposed curved portions and a pair of parallel side portions extending therebetween.

3. The follower mechanism of claim 2, wherein a shaft aperture is defined in each of the parallel side portions of the inner cup.

4. The follower mechanism of claim 2, wherein the pair of shaft apertures are defined in the side wall of the inner cup and a cylindrical boss is formed around each shaft aperture, the cylindrical bosses extending inwardly from the side wall toward the longitudinal center axis of the follower mechanism.

5. The follower mechanism of claim 4, wherein the first and the second ends of the shaft are rotatably received in the shaft apertures.

6. The follower mechanism of claim 2, wherein the inner cup further comprises an alignment device that extends radially outwardly therefrom through an aperture defined in the side wall of the outer cup.

7. The follower mechanism of claim 6, wherein the alignment device further comprises a tab that is integrally formed with the inner cup.

8. The follower mechanism of claim 1, wherein the roller follower comprises an outer race rotatably received about the shaft and a plurality of rollers disposed between the outer race and the shaft, wherein the outer race includes an annular beveled surface at each end.

9. The follower mechanism of claim 1, wherein an annular ledge is disposed at the first end of the outer cup adjacent the annular lip portion.

10. The follower mechanism of claim 9, wherein the annular lip portion is thinner than the side wall of the outer cup in a radial direction with respect to the longitudinal center axis of the follower mechanism.

* * * * *